(12) United States Patent
Lin

(10) Patent No.: US 6,178,616 B1
(45) Date of Patent: Jan. 30, 2001

(54) CIRCULATING TYPE MILLING APPARATUS FOR MILLING A LOCK CORE KEYWAY

(76) Inventor: Weng-Teh Lin, 210 Broadway, Nashville, TN (US) 37210

( * ) Notice: Under 35 U.S.C. 154(b), the term of this patent shall be extended for 0 days.

(21) Appl. No.: 09/379,314

(22) Filed: Aug. 23, 1999

(51) Int. Cl.$^7$ .............. B23Q 7/02; B23D 37/10
(52) U.S. Cl. .............. 29/563; 29/564; 409/251; 409/259
(58) Field of Search ............ 29/563, 564; 409/250, 409/251, 259, 269, 270, 271, 272, 273, 274, 275

(56) References Cited

U.S. PATENT DOCUMENTS

| | | | |
|---|---|---|---|
| 2,343,420 | * | 3/1944 | Podesta ............................ 409/250 |
| 2,893,293 | * | 7/1959 | Poynter ............................ 409/273 |
| 3,799,030 | * | 3/1974 | Schubert ....................... 409/259 X |
| 4,432,130 | * | 2/1984 | Gabriele ............................ 29/563 |
| 5,326,201 | * | 7/1994 | King ............................ 29/563 X |

FOREIGN PATENT DOCUMENTS

| | | |
|---|---|---|
| 37696 | 6/1981 | (TW) . |
| 44973 | 7/1982 | (TW) . |
| 300181 | * 3/1997 | (TW) ............................ 29/563 X |

* cited by examiner

*Primary Examiner*—William Briggs

(57) ABSTRACT

A circulating type milling apparatus for milling a lock core keyway includes a frame with a rotating disc that is intermittently rotated through a pre-determined angle. Lock core seats are equidistantly provided on the rotating disc. A milling disc is mounted to a top plate of the frame and includes cutters, ejecting plate, and detectors mounted thereon. The cutters are lowered to mill a keyway in each lock core. When the cutters are further moved downward and thus disengaged from the lock cores, the rotating disc is rotated by a distance that is equal to a half distance between two adjacent lock core seats such that each lock core seat is in a positioning in alignment with an associated detector yet not in alignment with an associated cutter. When the milling disc is moved upward, the detector checks whether the milled keyway of the lock core meets the required standard. The ejecting plate ejects the finished milled lock core, and a new lock core is fed by a lock core supplying device.

8 Claims, 9 Drawing Sheets

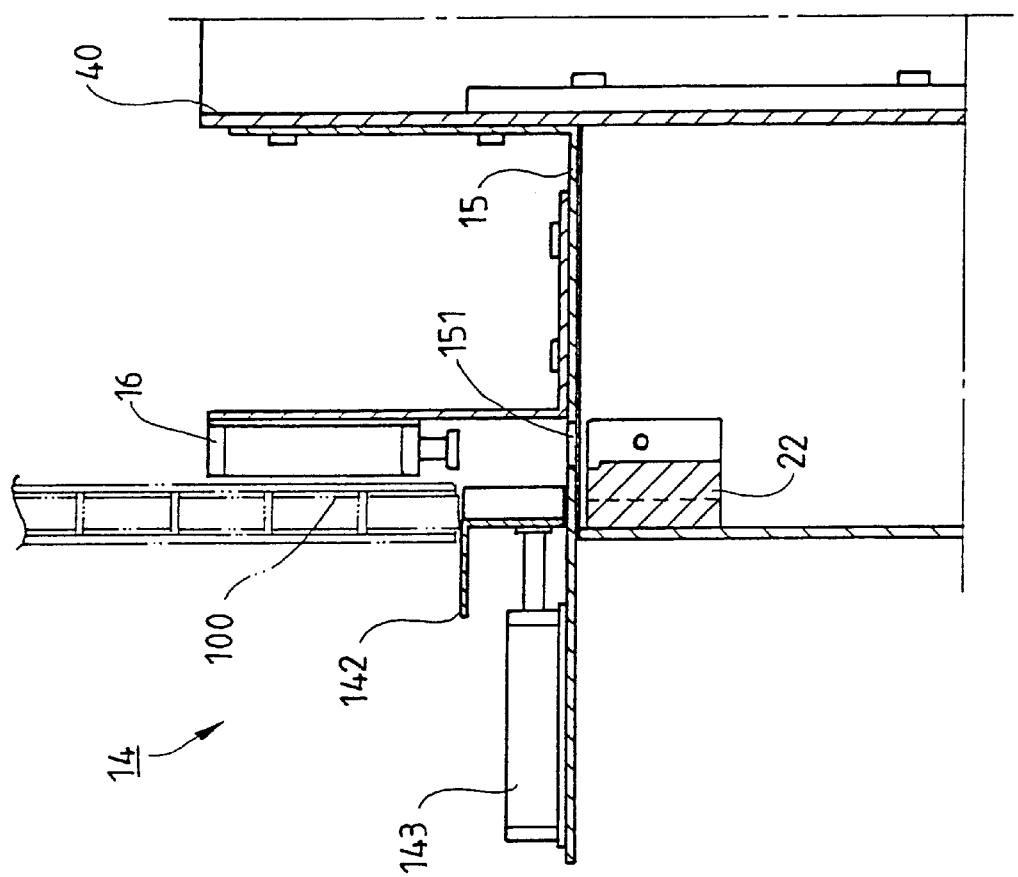

CIRCULATING TYPE MILLING APPARATUS FOR MILLING A LOCK CORE KEYWAY

BACKGROUND OF THE INVENTION

1. Field of the Invention

The present invention relates to a circulating type milling apparatus for milling the keyway of a lock core at high speed.

2. Description of the Related Art

Taiwan Utility Model Publication No. 37696, entitled "AUTOMATIC MILLING DEVICE FOR LOCK CORES" and issued on Jun. 1, 1981, discloses a reciprocating cutter mounted on a movable base, a key being provided on the base for activating a control rod and a control arm for automatically urging a lock core to fall into a milling seat and thus be milled to form a keyway.

Taiwan Utility Model Publication No. 44973, entitled "MILLING DEVICE FOR LOCK CORES" and issued on Jul. 1, 1982, discloses a base with a cutter seat to which a cutter is mounted, and a motor is provided for driving a chain wheel. A milling seat frame and a milling seat are carried by a chain and thus conveyed along the conveying direction such that a lock core in the milling seat is milled by the cutter on the base to form a keyway.

It is, however, found that the milling speeds of the milling devices discloses in the above two disclosures are relatively low, only 3–4 lock cores are milled per minute. In addition, the whole cutter must be replaced if a small portion of the cutter is damaged, which is not economical.

Taiwan Utility Model Publication No. 300181, entitled "REVOLVER TYPE MILLING DEVICE FOR LOCK CORES" and issued on Mar. 11, 1997, discloses a frame with a revolver disc rotatably supported by a bearing and having posts for a working table that is moved vertically by a cylinder means. The revolver disc is attached to a shaft that is rotatably held by the bearing. A bevel gear is intermittently driven to cause the revolver disc to travel through a certain angle at regular time. A number of seats are mounted on the revolver disc for holding lock cores. When the working table is moved by the cylinder means, cutters on the working table mill the lock cores on the revolver disc in response to reciprocating movements of the posts of the frame, and the milling procedure on each lock core is continued when the revolver disc is rotated to next angular position to finally form a keyway on each lock core. It is, however, found that a tooth space difference exists when the lock core is turned, as the bevel gear is intermittently driven. Accordingly, the keyway formed by milling has a larger tolerance, resulting in lock cores with unreliable quality.

The present invention is intended to provide a circulating type milling apparatus for milling a lock core keyway that mitigates and/or obviates the above problems.

SUMMARY OF THE INVENTION

It is a primary object of the present invention to provide a circulating type milling apparatus for precisely and rapidly milling a lock core keyway for each lock core.

A circulating type milling apparatus for milling a lock core keyway in accordance with the present invention comprises a frame with a rotating disc that is rotated through a predetermined angle. Lock core seats are provided on the rotating disc. Lock cores are filled into the lock core seats one by one and then milled by cutters that are mounted to a vertically movable milling disc, which, in turn, is actuated by, e.g., a hydraulic cylinder. The cutters are guided downward by tracks arranged on an annular fixed wall for simultaneously milling the lock cores. When a lower sensor detects that the cutters are moved downward and thus disengaged from the lock cores, the rotating disc is rotated by a distance that is equal to a half distance between two adjacent lock core seats such that each lock core seat is in a positioning in alignment with a detector. When the milling disc is moved upward, the detector checks whether the milled keyway of the lock core meets the required standard. If a cutter fails to mill the keyway to the required standard as a result of wear, the detector sends a signal to stop the whole milling apparatus for replacing the cutter. When an upper sensor detects that the milling disc is moved upward to a preset position, the detector disengages from the lock core seat, and the rotating disc is rotated again by a distance that is equal to a half distance between two adjacent lock core seats for next milling. Milling of the lock core is finished when the rotating disc is rotated through 360°, and the milled lock core is ejected by an ejecting plate.

Other objects, advantages, and novel features of the invention will become more apparent from the following detailed description when taken in conjunction with the accompanying drawings.

BRIEF DESCRIPTION OF THE DRAWINGS

FIG. 6 is a sectional view taken along line 6—6 in FIG. 2;

DETAILED DESCRIPTION OF THE PREFERRED EMBODIMENT

Figure 1:
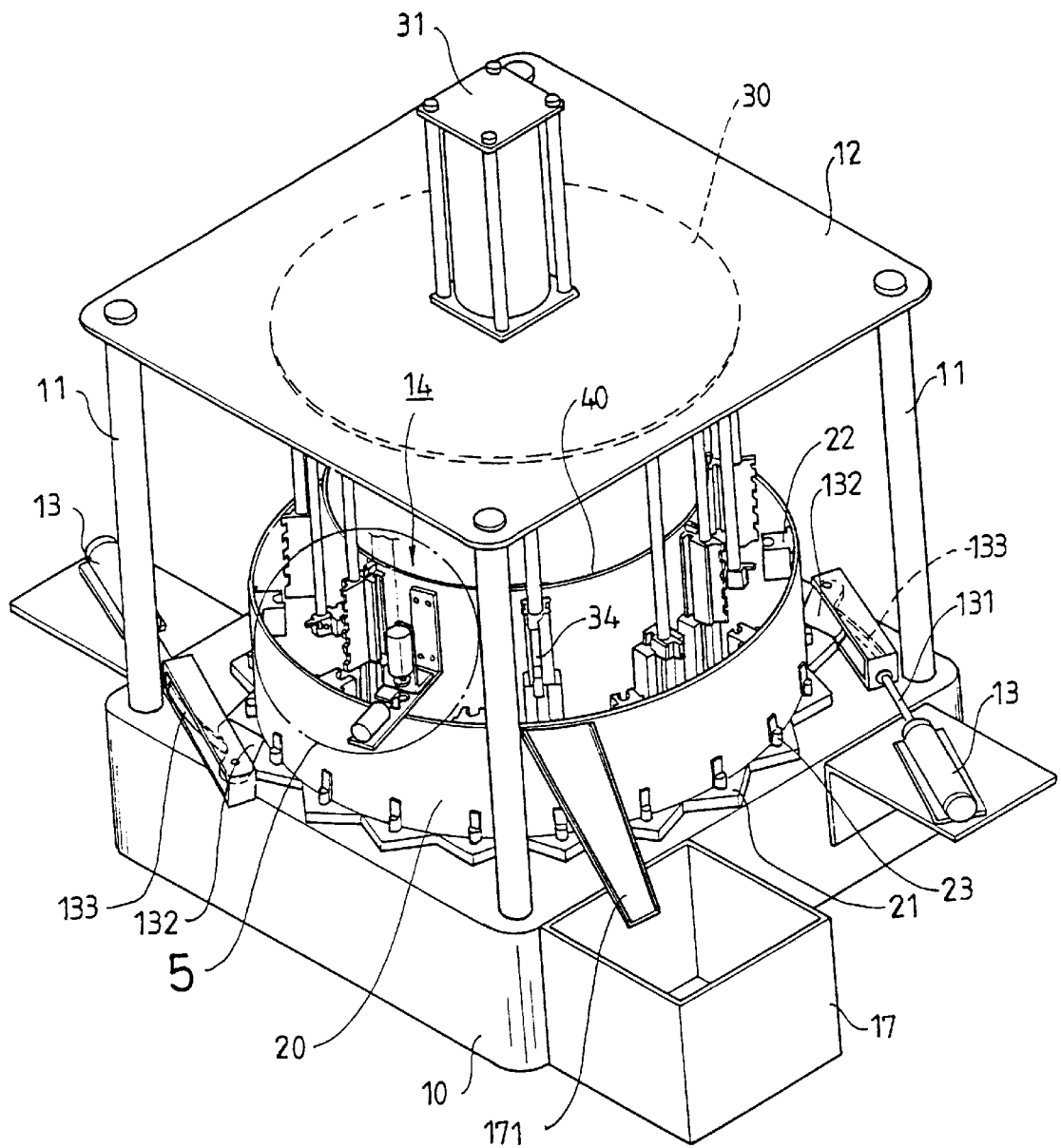
FIG. 1 is a perspective view of a circulating type milling apparatus in accordance with the present invention.
Figure 2:
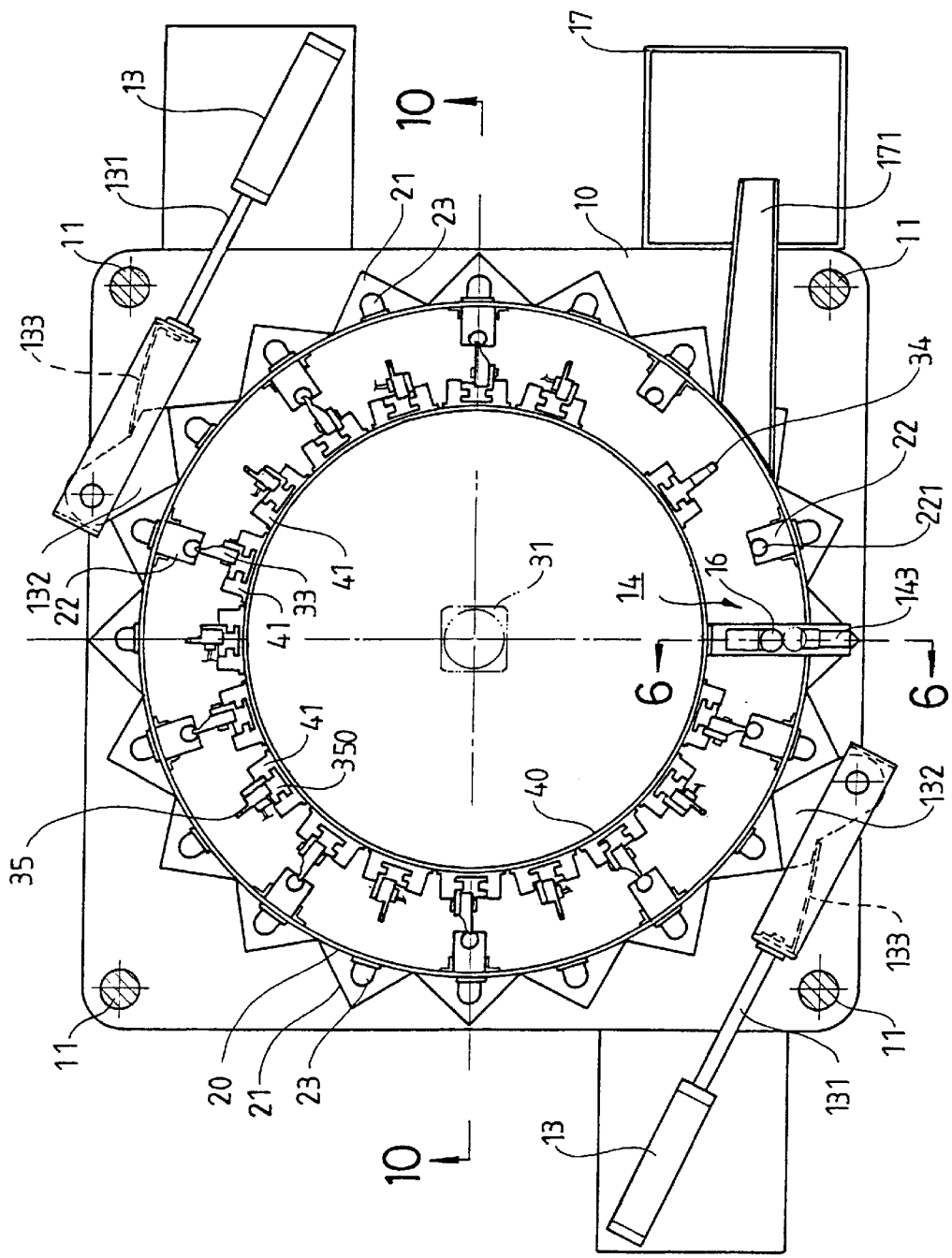
FIG. 2 is a top plan view of a circulating type milling apparatus in accordance with the present invention, wherein the top plate is removed for clarity.

Referring to FIGS. 1 and 2, a circulating type milling apparatus in accordance with the present invention generally includes a frame 10, a rotating disc 20, a milling disc 30, and an annular fixed wall 40. The frame 10 includes a plurality of posts 11 for supporting a top plate 12. At least one cylinder (two hydraulic cylinders 13 in this embodiment) is provided to cause the rotating disc 20 to rotate. Each cylinder 13 includes an actuating rod 131 with a ratchet tooth member 132 pivotally connected to a distal end thereof. The rotating disc 20 includes a plurality of teeth 21 formed on an outer periphery thereof for releasably meshing with the ratchet tooth member 132. When the actuating rod 131 of the cylinder 13 retracts from an extended position shown in FIG. 2 to a retracted position shown in FIG. 3, the rotating disc 20 is rotated, e.g., clockwise through a tooth pitch by the ratchet tooth member 132. When the actuating rod 131 of the cylinder 13 extends from the retracted position in FIG. 3, the ratchet tooth member 132 slides over the tip of an associated tooth 21 (see FIG. 4) and then engages with next two adjacent teeth 21 of the rotating disc 20. As illustrated in FIG. 4, during sliding movement, the ratchet tooth member 132 is pivoted by the associated tooth 21 and bears against a resilient plate 132 that biases the ratchet tooth member 132 to engage with the teeth 21 of the rotating disc 20.

Figure 5:
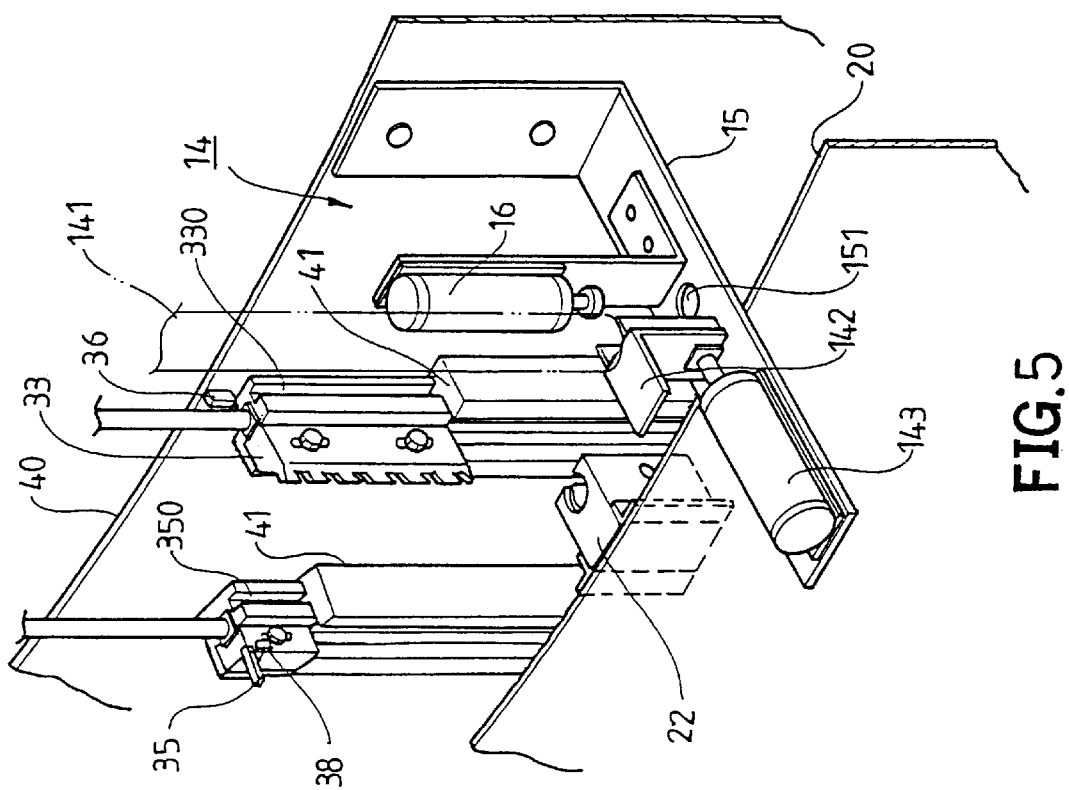
FIG. 5 is an enlarged perspective view of a circle in FIG. 1.
Figure 7:
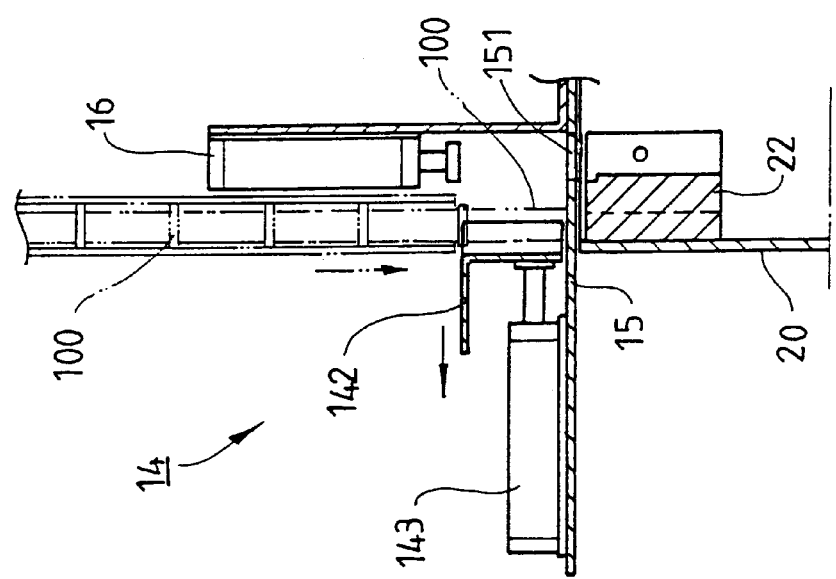
FIG. 7 is a sectional view similar to FIG. 6, wherein the stop plate is moved to a position allowing next lock core to fall onto the support plate.

Referring to FIGS. 5 and 6, the frame 10 includes a lock core supplying means 14 that utilizes a guide tube 141 for allowing lock cores 100 to fall onto a support plate 15 one by one. A stop plate 142 is provided under the guide tube 141 and actuated by a cylinder 143. When the stop plate 142 is below the guide tube 141, falling (i.e., feeding) of the lock cores 100 is stopped, as shown in FIG. 6. When the stop plate 142 is moved away from the guide tube 141, a lock core 100 falls onto the support plate 15, best shown in FIG. 7. Next, the stop plate 142 is actuated again by the cylinder 143 to a place below the guide tube 142, thereby stopping falling of next lock core 100 and pushing the lock core 100 to a hole 151 in the support plate 15. As a result, the lock core 100 falls into an associated lock core seat 20 via the hole 151 under actuation of a cylinder 16 above the hole 151. Next retracting stroke of the cylinder 143 causes the next lock core 100 to fall onto the support plate 15.

Referring to FIGS. 1 and 2 again, the frame 10 further includes a guide plate 171 for guiding a milled lock core into a collecting box 17.

Figures 9, 10:
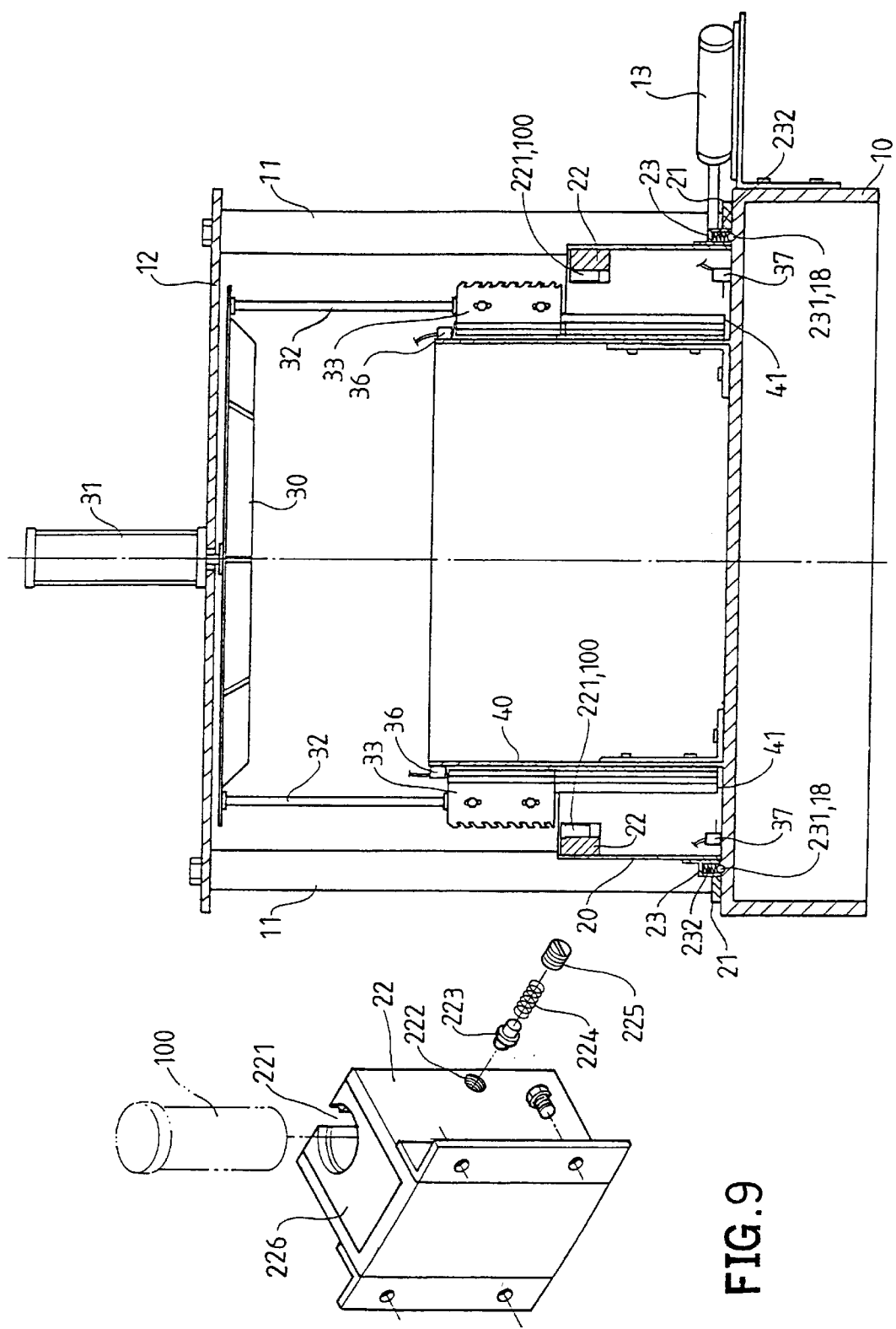
FIG. 9 is a perspective view, partly exploded, of the lock core seat.
FIG. 10 is a sectional view taken along line 10—10 in FIG. 2.

The teeth 21 on the rotating disc 20 are equidistantly arranged. When a respective tooth 21 is pushed by the ratchet tooth member 132, the rotating disc 20 is rotated through a distance equal to a half distance between two adjacent lock core seats 22. In order to provide a better positioning effect after rotation of the rotating disc 20, a plurality of positioning members 23 are provided to the periphery of the rotating disc 20. As illustrated in FIG. 10, each positioning member 23 includes a steel ball 231 and an elastic element 232. In addition, the frame 10 includes a plurality of annularly, equidistantly arranged arcuate depressions 18. Each steel ball 231 is biased by the associated elastic element 232 to be releasably retained in an associated depression 18. Thus, the rotating disc 20 may be precisely positioned after every rotation.

Referring to FIGS. 2, 9, and 10, a plurality of lock core seats 20 are equidistantly, annularly provided to an inner periphery of the rotating disc 20. Each lock core seat 20 includes a slotted hole 221 (namely, a longitudinal slot is defined in a wall defining the hole 221) for receiving a lock core 100. The hole 221 has a diameter slightly greater than a relatively smaller diameter of the lock core 100 yet smaller than a relatively larger diameter of the lock core 100. Thus, the lock core 100 can be held in the lock core seat 22. In order to prevent rotation of the lock core 100 in the lock core seat 22, a transverse hole 222 (preferably threaded) is defined in the lock core seat 22 for receiving a retainer 223, an elastic element 224, and a fixing member 225 with an outer threading for threadedly engaged with the transverse screw hole 222. The retainer 223 is made of soft material and biased outward by the elastic element 224 to bear against the lock core 100 and thus retain the lock core 100 in place, thereby preventing rotation of the lock core 100 in the lock core seat 22. It is appreciated that the retainer 223 is partially received in the transverse hole 222 when the former is biased outward. In addition, the lock core seat 22 may include an inner seat 26 secured in place by the fixing member 225. The inner seat 26 may be easily and quickly replaced by a new one if a change in the diameter of the slotted hole is required.

Referring to FIGS. 1 and 10, the milling disc 30 is connected to and thus actuated by a cylinder 31 so as to move vertically upon actuation of the cylinder 31 that is secured to the top plate 12 of the frame 10. The milling disc 30 includes a plurality of downwardly extending rods 32 each having a cutter 33 attached to a distal end thereof (FIG. 5). The cutters 33 are arranged equidistantly on the same circle to mill the lock core keyway gradually (step by step). Thus, upon intermittent rotation of the rotating disc 20, the lock core 100 is milled step by step by the cutters 33 one by one and finally forms its keyway.

Figure 11:
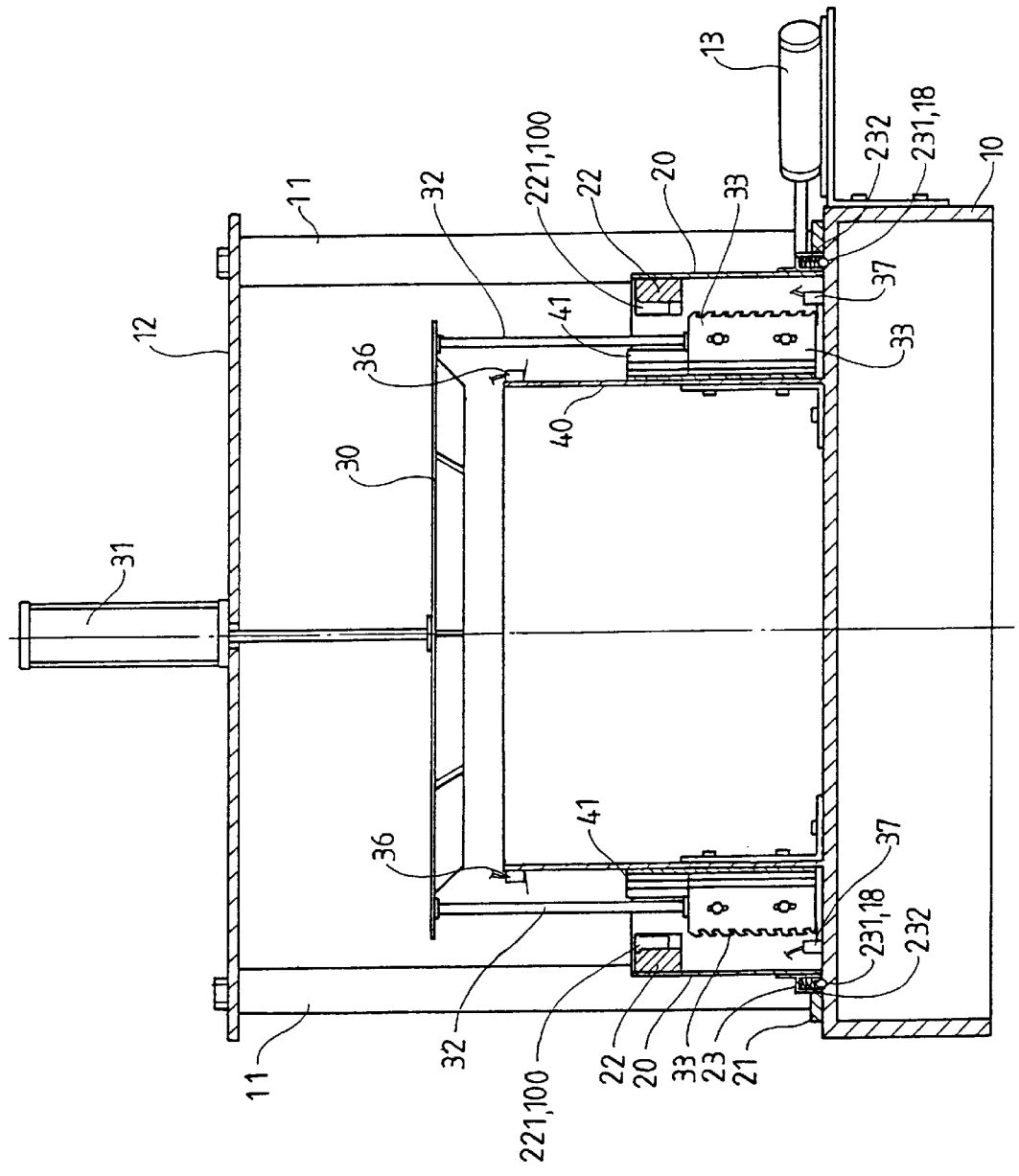
FIG. 11 is a sectional view similar to FIG. 10, wherein the cutters are moved to the bottommost position.

Referring to FIGS. 2, 10, and 11, an upper sensor 36 and a lower sensor 37 are provided to the fixed wall 40. When the cutters 33 are disengaged from the lock core seats 22, the cutters 33 are moved to engage with the upper sensor 36 (if moved upward, FIG. 10) or the lower sensor 37 (if moved downward, FIG. 11). A signal is sent to cause rotation of the rotating disc 20. Namely, rotation of the rotating disc 20 cannot be undergone unless it is confirmed that the cutters 33 are disengaged from the lock core seats 22 by detecting contact between the cutters 33 and either sensor 36, 37.

Figure 12:
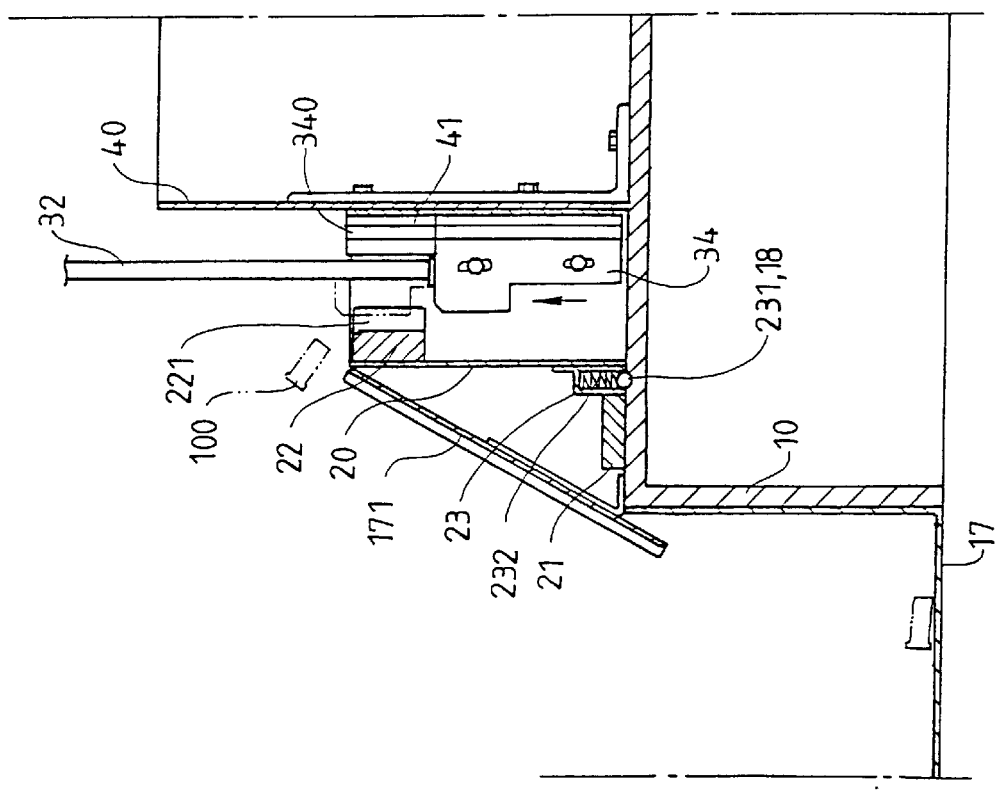
FIG. 12 is a sectional view taken along line 12—12 in FIG. 3.

Referring to FIGS. 1, 2, and 12, one of the rods 32 has an ejecting plate 34 for ejecting a milled lock core 100 from the lock core seat 22. The ejecting plate 34 is plate-like and is capable of ejecting the lock core 100 upward via the slotted hole 221 of the lock core seat 22 when the milling disc 30 is moved upward, thereby causing the lock core 100 to fall into the collecting box 17 via a guide plate 171.

Figure 13:
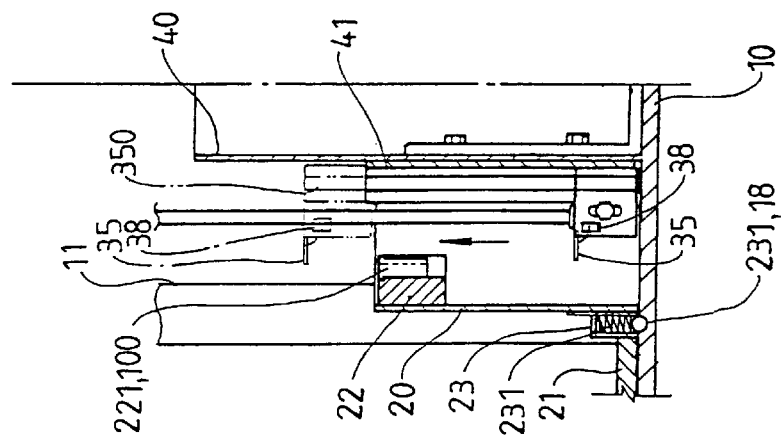
FIG. 13 is a sectional view taken along line 13—13 in FIG. 3.

Referring to FIGS. 2, 5, and 13, in order to check whether the milled keyway of every lock core meets the preset standard, a detector 35 is secured to each rod 32 and located behind the associated cutter 33 along the rotating direction. The detectors 35 and the cutters 33 are equidistantly arranged on the same circle. When the rotating disc 20 is rotated through a tooth pitch, the lock core 100 in the lock core seat 22 aligns with to an associated cutter and an associated detector 35. Thus, when the milling disc 30 is moved downward, the cutters 33 mill the lock core 100. When the milling disc 30 is moved upward, the detector 35 checks whether the keyway is milled to meet the required standard. The detector 35 has a plate with a width slightly smaller than the cutter 33. Thus, when the plate of the detector 35 is in contact with the lock core 100 (i.e., the milled keyway does not meet the required standard), a signal is sent by a sensor 38 to stop the whole milling apparatus for replacing the abnormal cutter 33.

Figure 3:
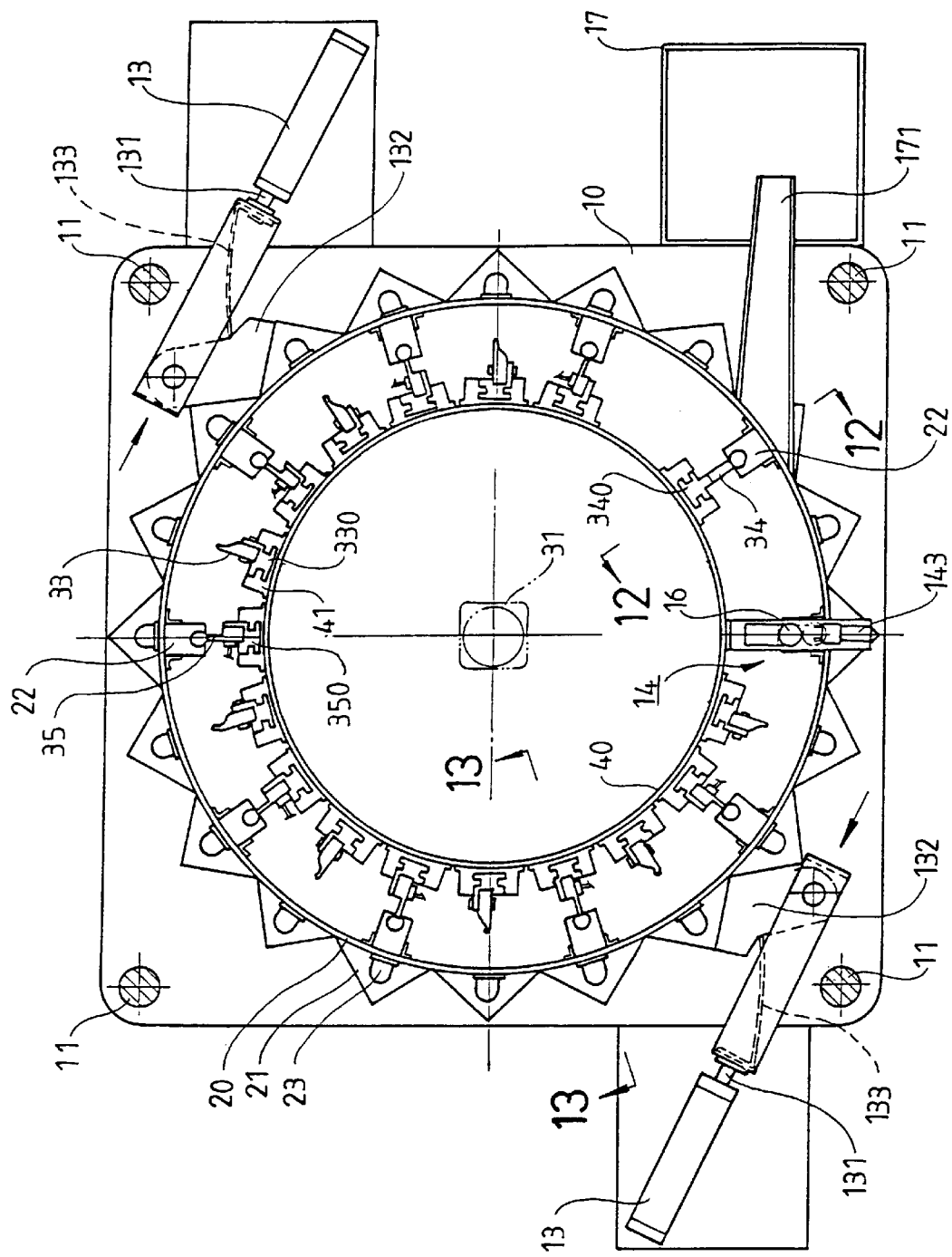
FIG. 3 is a view similar to FIG. 2, wherein the rotating disc is rotated through a tooth pitch.
Figure 4:
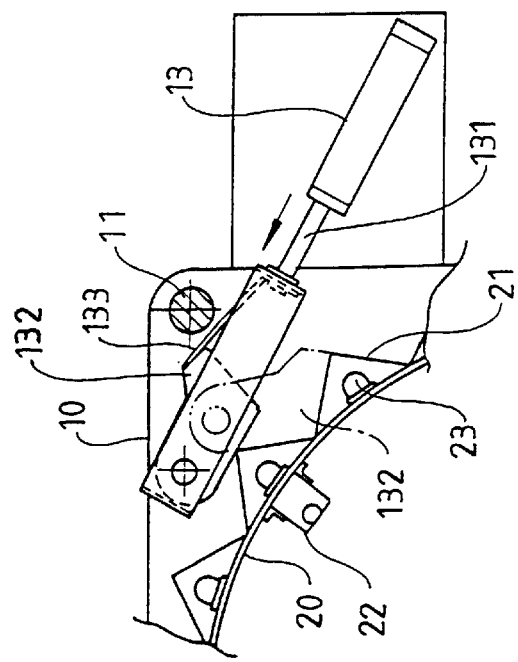
FIG. 4 is a top view illustrating operation between a ratchet tooth and the tooth of the rotating disc.
Figure 8:
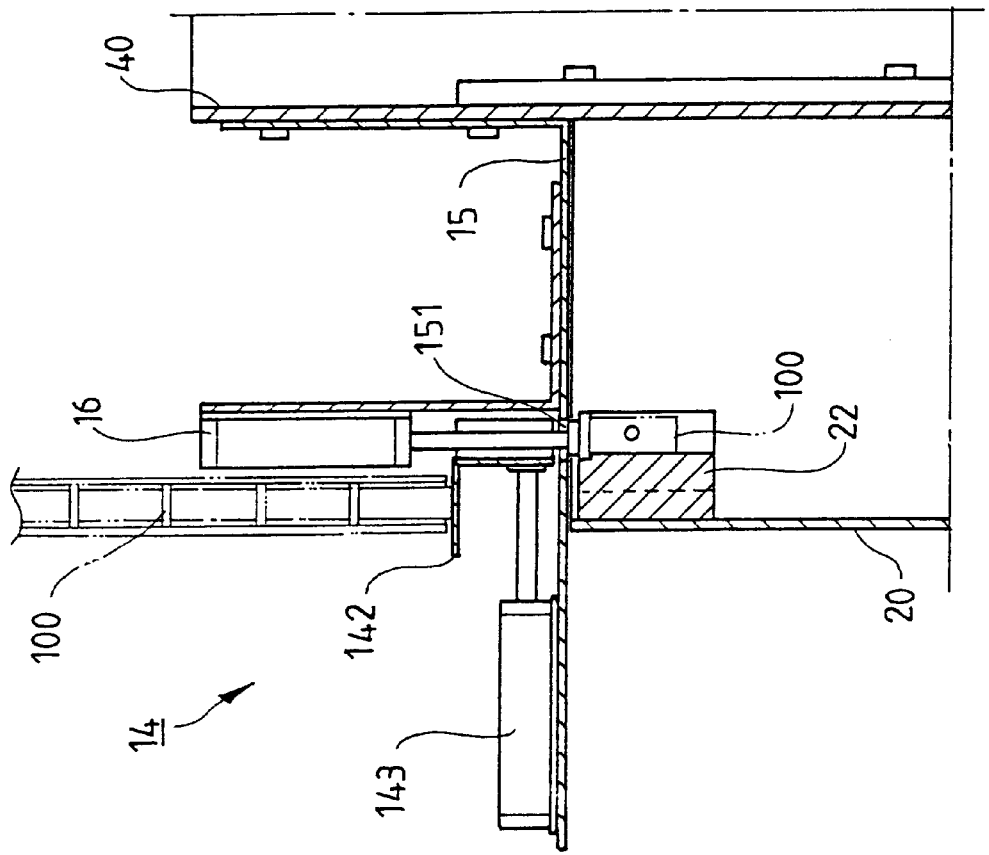
FIG. 8 is a sectional view similar to FIG. 7, wherein the lock core is pushed to a position above a hole in the support plate.

Referring to FIGS. 2, 3, and 5, in order to provide stable vertical movements for the cutters 33, the ejecting plate 34, and the detectors 35, the annular fixed wall 40 on the frame 10 includes a plurality of tracks 41 for slidingly engaging with fixing seats 330, 340, and 350 respectively for the cutters 33, the ejecting plate 34, and the detectors 35. Thus, when the milling disc 30 moved vertically, the cutters 33, the ejecting plate 34, and the detectors 35 move rectilinearly along the vertical direction without any deviation.

Referring to FIGS. 2 and 10, the milling disc 30 is moved downward for milling the keyway when the lock core seat 22 is in a position aligned with an associated cutter 33 (FIG. 11). After the milling disc 30 is moved downward to a preset position, the lower sensor 37 sends a signal (the cutter 33 disengages from the lock core 100 and the lock core seat 22) to actuate the cylinder 13 for rotating the disc 20 clockwise through a tooth pitch (FIG. 3). The lock core 100 is in a position aligned with a detector 35. Thus, when the milling disc 30 is moved upward, the keyway just milled is allowed to pass through the detector 35 if the keyway meets the required standard. At this time, the cutter 33 does not contact with the lock core 100 during the upward movement of the milling disc 30. The lock core 100 is milled by all cutters 33 one by one when the rotating disc 20 is rotated through 360°. The finished lock core 100 is ejected upward by the ejecting plate 34 and thus falls into the collection box 17. New lock cores 100 are supplied via the lock core supplying means 14 for milling.

According to the above description, it is appreciated that the lock cores are milled quickly and precisely by the circulating type milling apparatus in accordance with the present invention.

Although the invention has been explained in relation to its preferred embodiment, it is to be understood that many other possible modifications and variations can be made without departing from the spirit and scope of the invention as hereinafter claimed.

What is claimed is:

1. A circulating type milling apparatus for milling a lock core keyway, comprising:

a frame including a plurality of posts and a top plate supported by the posts, the frame further comprising a lock core supplying means for guiding a plurality of lock cores to fall one by one, the frame further comprising a collecting box and a guide plate for guiding milled lock cores into the collecting box, the frame further including a ratchet tooth member;

a rotating disc intermittently driven by the ratchet tooth member, the rotating disc including a plurality of equidistantly arranged lock core seats located on the same circle, each said lock core seat holding an associated said lock core therein;

an actuating cylinder secured to the to plate and including an actuating rod;

a milling disc connected to and thus actuatable by the actuating rod in a vertical direction, the milling disc including a plurality of downwardly extending rods each having a cutter secured thereto, the cutters being arranged equidistantly on the same circle for milling each said lock core gradually, each said rod further including a detector provided thereon, wherein one of the rods including an ejecting plate provided thereon and located between a first one of the cutters and the last one of the detectors, each said detector being located behind an associated said cutter on the same rod along a rotating direction of the rotating disc, each said detector including a plate with a width slightly smaller than that of the associated cutter;

a plurality of fixing seats mounted to the rods for securely receiving the cutters, the ejecting plate, and the detectors, respectively; and a fixed wall including a plurality of tracks for providing sliding engagement with the fixing seats for the cutters, the ejecting plates, and the detectors, the fixed wall further including a lower sensor and an upper sensor mounted thereon;

whereby when the milling disc is moved downward, the cutters mill a keyway in each said lock core, when the cutters are moved downward to a position in contact with the lower sensor, the lower sensor sends a signal to cause the rotating disc to rotate through a tooth pitch, and the milling disc is then moved upward, and each said detector checks whether the keyway just milled meets a required standard, and wherein a completely milled lock core is ejected by the ejecting plate.

2. The circulating type milling apparatus for milling a lock core keyway as claimed in claim 1, further comprising a second cylinder with a second actuating rod to which the ratchet tooth member is connected, and a resilient plate for biasing the ratchet tooth member to engage with the teeth of the rotating wheel, thereby driving the rotating wheel in one direction when the second actuating rod is actuated.

3. The circulating type milling apparatus for milling a lock core keyway as claimed in claim 1, wherein the lock core supplying means including a guide tube to allow the lock cores in the guide tube to fall one by one, each said lock core seat including a slotted hole, and further comprising a support plate for supporting the lock core from the guide tube, the support plate including a hole communicated with an associated said lock core seat, a second cylinder with a second actuating rod, a stop plate being connected to the second actuating rod to move therewith, the stop plate being movable between a first position below the guide tube to prevent falling of the lock cores and a second position away from the guide tube to allow falling of one of the lock cores onto the support plate, the lock core on the support plate being pushed by the second actuating rod and falling into the slotted hole of the associated lock core seat via the hole of the support plate.

4. The circulating type milling apparatus for milling a lock core keyway as claimed in claim 3, further comprising a third cylinder above the hole of the support plate for pushing the lock core on the support plate into the slotted hole of the associated lock core seat.

5. The circulating type milling apparatus for milling a lock core keyway as claimed in claim 3, wherein each said lock core seat includes a transverse hole communicated with the slotted hole thereof, a retainer and an elastic element being mounted in the transverse hole and sealed by a fixing member that is also mounted in the transverse hole, the elastic element biasing the retainer into the slotted hole of the lock core seat for retaining the lock core in the lock core seat in place.

6. The circulating type milling apparatus for milling a lock core keyway as claimed in claim 1, wherein each said lock core seat includes a replaceable inner seat that is retained by a fixing member, wherein the inner seat is replaced when a change in a diameter of the slotted hole of the lock core is required.

7. The circulating type milling apparatus for milling a lock core keyway as claimed in claim 5, wherein the retainer is made of soft material.

8. The circulating type milling apparatus for milling a lock core keyway as claimed in claim 1, wherein the rotating disc includes a plurality of positioning members each including a steel ball and an elastic element for biasing the steel ball, and wherein the frame includes a plurality of arcuate depressions each for releasably retaining an associated said steel ball biased by an associated steel ball, thereby retaining the rotating disc in place after each rotational movement thereof.

* * * * *